(12) United States Patent
Yin

(10) Patent No.: US 11,314,564 B2
(45) Date of Patent: Apr. 26, 2022

(54) BLOCKCHAIN EVENT PROCESSING METHOD AND APPARATUS

(71) Applicant: Alipay (Hangzhou) Information Technology Co., Ltd., Zhejiang (CN)

(72) Inventor: Mingliang Yin, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/362,740

(22) Filed: Jun. 29, 2021

(65) Prior Publication Data

US 2022/0019490 A1    Jan. 20, 2022

(30) Foreign Application Priority Data

Jul. 17, 2020  (CN) .......................... 202010691345.1

(51) Int. Cl.
*G06F 9/54* (2006.01)
*G06F 16/27* (2019.01)

(52) U.S. Cl.
CPC .............. *G06F 9/542* (2013.01); *G06F 16/27* (2019.01)

(58) Field of Classification Search
None
See application file for complete search history.

(56) References Cited

U.S. PATENT DOCUMENTS

| 2012/0271880 | A1 | 10/2012 | Sachdeva et al. |
| 2017/0155652 | A1 | 6/2017 | Most et al. |
| 2020/0019545 | A1* | 1/2020 | Ye ....................... G06F 16/2255 |
| 2020/0151269 | A1 | 5/2020 | Christidis et al. |
| 2020/0177373 | A1 | 6/2020 | Komandur et al. |
| 2020/0304518 | A1* | 9/2020 | Thekadath .............. H04L 63/08 |
| 2021/0132869 | A1* | 5/2021 | Tian ....................... G06F 3/0659 |

FOREIGN PATENT DOCUMENTS

| CN | 103077228 A | 5/2013 |
| CN | 110333940 A | 10/2019 |
| CN | 111108521 A | 5/2020 |
| CN | 111178958 A | 5/2020 |

* cited by examiner

*Primary Examiner* — Charles E Anya
(74) *Attorney, Agent, or Firm* — Seed IP Law Group LLP

(57) ABSTRACT

The present specification provides a blockchain event processing method and apparatus, applied to a control component of distributed event processing centers connected to a node device of a blockchain network. The distributed event processing centers obtain respective blockchain event streams from the node device, and deliver the obtained respective blockchain event streams to respective triggers included in the distributed event processing centers, so that when a blockchain event included in the blockchain event streams meets a corresponding trigger condition, a trigger of the triggers pushes the blockchain event to a service system connected to the trigger. The method includes: obtaining push speeds of a plurality of triggers included in an event processing center of the distributed event processing centers; and if a difference among the push speeds of the plurality of triggers is greater than a predetermined first threshold, establishing a new event processing center between the event processing center and a child event processing center of the event processing center, and moving the plurality of triggers to the new event processing center.

20 Claims, 12 Drawing Sheets

202 — Distributed event processing centers obtain respective blockchain event streams from a node device 204 — The distributed event processing centers deliver the respective obtained blockchain event streams to respective triggers included in the distributed event processing centers, so that when a blockchain event included in the blockchain event streams meets a corresponding trigger condition, a trigger of the triggers pushes the blockchain event to a service system connected to the trigger, where a difference between a maximum push speed and a minimum push speed of all triggers on blockchain events that are included in an event processing center of the distributed event processing centers is less than a predetermined first threshold 202 — Distributed event processing centers obtain respective blockchain event streams from a node device 204 — The distributed event processing centers deliver the respective obtained blockchain event streams to respective triggers included in the distributed event processing centers, so that when a blockchain event included in the blockchain event streams meets a corresponding trigger condition, a trigger of the triggers pushes the blockchain event to a service system connected to the trigger, where a difference between a maximum push speed and a minimum push speed of all triggers on blockchain events that are included in an event processing center of the distributed event processing centers is less than a predetermined first threshold

*Fig. 2*

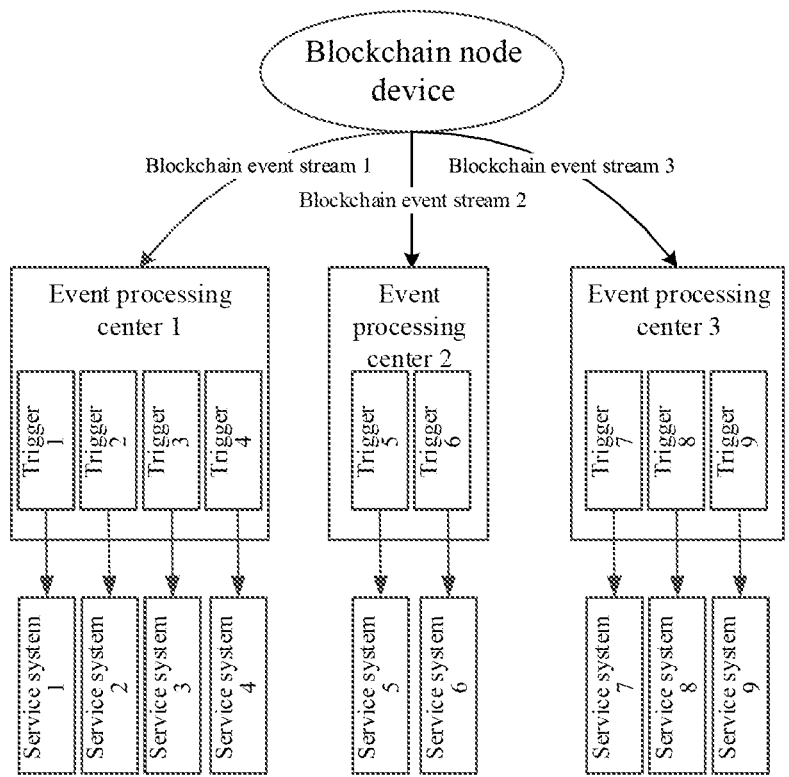

*Fig. 3*

BLOCKCHAIN EVENT PROCESSING METHOD AND APPARATUS

BACKGROUND

Technical Field

One or more implementations of the present specification relate to the network communication field, and in particular, to a blockchain event processing method and apparatus.

Description of the Related Art

Various events are generated when a user uses the blockchain. For example, a new block is generated after a network consensus is reached. The user initiates a transaction by using a software development kit (SDK) and writes the transaction into a ledger. Alternatively, the user invokes a function of a certain smart contract to perform a specific operation. These events are of great value to an external service system. The external service system can process the information, and feedback a processing result to an actual service. For example, a change of a certain account balance on the blockchain is monitored by subscribing to a specific event. Alternatively, a block mining speed, a transaction speed, etc., in the network are monitored by subscribing to a specific event.

In practice, there is generally a plurality of systems expecting to subscribe to an event from a blockchain node: When initiating a transaction, the SDK subscribes to an event to determine whether the transaction is successfully executed and written into the ledger. A monitoring system subscribes to an event to monitor counter data such as the block mining speed and the number of transactions in the blockchain network. A service system performs different operations based on a change of a specific state on the blockchain.

BRIEF SUMMARY

One or more implementations of the present specification provide a blockchain event processing method, applied to a control component of distributed event processing centers connected to a node device of a blockchain network. The distributed event processing centers obtain respective blockchain event streams from the node device, and deliver the obtained respective blockchain event streams to respective triggers included in the distributed event processing centers, to push a blockchain event included in the blockchain event streams to a service system corresponding to a trigger of the triggers when the blockchain event meets a trigger condition in the trigger.

The method includes: obtaining push speeds of a plurality of triggers included in an event processing center of the distributed event processing centers; and if a difference among the push speeds of the plurality of triggers is greater than a predetermined first threshold, establishing a new event processing center, and moving, to the new event processing center, a trigger having a push speed that is different from a highest push speed of the push speeds by an amount greater than the first threshold, or a trigger having a push speed that is different from a lowest push speed of the push speeds by an amount greater than the first threshold.

In an illustrative implementation, the method further includes: establishing a sequence among the distributed event processing centers by sorting the distributed event processing centers level by level based on a delivery progress of each event processing center on a respective blockchain event stream, where a delivery progress of a parent event processing center on a blockchain event stream of the parent processing center is greater than a delivery progress of a child event processing center of the parent event processing center on a blockchain event stream of the child processing center.

In an illustrative implementation, the establishing the new event processing center, and moving, to the new event processing center, the trigger having a push speed that is different from the highest push speed by an amount greater than the first threshold, or the trigger having a push speed that is different from the lowest push speed by an amount greater than the first threshold includes: establishing a new child event processing center for the event processing center, and moving, to the new child event processing center, the trigger having a push speed that is different from the highest push speed by an amount greater than the first threshold; or establishing a new parent event processing center for the event processing center, and moving, to the new parent event processing center, the trigger having a push speed that is different from the lowest push speed by an amount greater than the first threshold.

In an illustrative implementation, the method further includes: obtaining a delivery progress of each event processing center in the distributed event processing centers on a respective blockchain event stream; and if a second delivery progress of a child event processing center of a parent event processing center in the distributed event processing centers on a blockchain event stream of the child event processing center is not less than a first delivery progress of the parent event processing center on a blockchain event stream of the parent event processing center, moving each trigger in the child event processing center to the parent event processing center, and removing the child event processing center.

In an illustrative implementation, the method further includes: if the second delivery progress of the child event processing center is less than the first delivery progress of the parent event processing center, and a difference between the second delivery progress and the first delivery progress is less than a predetermined second threshold, suspending the parent event processing center from delivering the blockchain event stream obtained by the parent event processing center to each trigger of the parent event processing center; when the second delivery progress becomes not less than the first delivery progress, moving the trigger included in the child event processing center to the parent event processing center, and removing the child event processing center; and restarting the parent event processing center to continue to deliver the blockchain event stream obtained by the parent event processing center to each trigger included in the parent event processing center.

In an illustrative implementation, the method further includes: removing an event processing center if the event processing center in the distributed event processing centers does not include any trigger.

In an illustrative implementation, the event processing center is a software development kit component coupled to the node device.

In an illustrative implementation, the method further includes: creating a new event processing center, the new event processing center including a new trigger, and the new trigger declaring a start or initial location of a blockchain event stream subscribed to by a service system corresponding to the new trigger; and setting the new event processing center as a parent event processing center of a first event processing center having a delivery progress that is less than the start or initial location.

In an illustrative implementation, the control component includes centralized control components, and the centralized control components are separately communicatively connected to the distributed event processing centers.

In an illustrative implementation, the control component includes distributed control components that are separately disposed in the distributed event processing centers, and each event processing center in the distributed event processing center sequence is communicatively connected to an adjacent event processing center.

The present specification further provides a blockchain event processing apparatus, applied to a control component of distributed event processing centers connected to a node device of a blockchain network. The distributed event processing centers obtain respective blockchain event streams from the node device, and deliver the obtained respective blockchain event streams to respective triggers included in the distributed event processing centers, to push a blockchain event included in the blockchain event streams to a service system corresponding to a trigger of the triggers when the blockchain event meets a trigger condition in the trigger.

The apparatus includes: an acquisition unit, configured to obtain push speeds of a plurality of triggers included in an event processing center of the distributed event processing centers; and an establishment unit, configured to: if a difference among the push speeds of the plurality of triggers is greater than a predetermined first threshold, establish a new event processing center, and move, to the new event processing center, a trigger having a push speed that is different from a highest push speed of the push speeds by an amount greater than the first threshold, or a trigger having a push speed that is different from a lowest push speed of the push speeds by an amount greater than the first threshold.

In an illustrative implementation, the apparatus further includes: a sorting unit, configured to establish a sequence among the distributed event processing centers by sorting the distributed event processing centers level by level based on a delivery progress of each event processing center on a respective blockchain event stream, where a delivery progress of a parent event processing center on a blockchain event stream of the parent processing center is greater than a delivery progress of a child event processing center of the parent event processing center on a blockchain event stream of the child processing center.

In an illustrative implementation, the establishment unit is further configured to: establish a new child event processing center for the event processing center, and move, to the new child event processing center, the trigger having a push speed that is different from the highest push speed by an amount greater than the first threshold; or establish a new parent event processing center for the event processing center, and move, to the new parent event processing center, the trigger having a push speed that is different from the lowest push speed by an amount greater than the first threshold.

In an illustrative implementation, the acquisition unit is further configured to obtain a delivery progress of each event processing center in the distributed event processing centers on a respective blockchain event stream; a movement unit is configured to: if a second delivery progress of a child event processing center of a parent event processing center in the distributed event processing centers on a blockchain event stream of the child event processing center is not less than a first delivery progress of the parent event processing center on a blockchain event stream of the parent event processing center, move each trigger in the child event processing center to the parent event processing center; and a removal unit is configured to remove the child event processing center.

In an illustrative implementation, the apparatus further includes: a suspending unit, configured to: if the second delivery progress of the child event processing center is less than the first delivery progress of the parent event processing center, and a difference between the second delivery progress and the first delivery progress is less than a predetermined second threshold, suspend the parent event processing center from delivering the blockchain event stream obtained by the parent event processing center to each trigger of the parent event processing center, where the movement unit is further configured to: when the second delivery progress becomes not less than the first delivery progress, move the trigger included in the child event processing center to the parent event processing center; and the removal unit is further configured to remove the child event processing center; and a restart unit, configured to restart the parent event processing center to continue to deliver the blockchain event stream obtained by the parent event processing center to each trigger included in the parent event processing center.

In an illustrative implementation, the removal unit is configured to remove an event processing center in response to the event processing center in the distributed event processing centers not including any trigger.

In an illustrative implementation, the event processing center is a software development kit component coupled to the node device.

In an illustrative implementation, the establishment unit is configured to create a new event processing center, the new event processing center including a new trigger, and the new trigger declaring a start or initial location of a blockchain event stream subscribed to by a service system corresponding to the new trigger; and the sorting unit is configured to set the new event processing center as a parent event processing center of a first event processing center having a delivery progress that is less than the start or initial location.

In an illustrative implementation, the control component includes centralized control components, and the centralized control components are separately communicatively connected to the distributed event processing centers.

In an illustrative implementation, the control component includes distributed control components that are separately disposed in the distributed event processing centers, and each event processing center in the distributed event processing center sequence is communicatively connected to an adjacent event processing center.

The present specification further provides a computer device, including a storage device and a processor. The storage device stores a computer program that can be run by the processor, and when running the computer program, the processor performs the blockchain event processing method performed by the control component.

According to the blockchain event processing method and apparatus, and the computer devices that are provided in the implementations of the present specification, the node device is connected to the distributed event processing centers. A plurality of triggers is disposed in the same event processing center, where a difference among push speeds of the triggers is less than a predetermined threshold. It can be ensured that a plurality of triggers with comparable push speeds trigger and push an event in the same event processing center. This effectively avoids wasting resources caused by a trigger with a high push speed having to wait for a trigger with a low push speed for a long time in the same event processing center, and improves event push efficiency of the event processing center. In addition, the plurality of triggers shares the same blockchain event stream in the same event processing center. Compared with a setting in which each trigger uses one blockchain event stream, network traffic overheads are effectively reduced, and network setting costs are reduced.

BRIEF DESCRIPTION OF THE SEVERAL VIEWS OF THE DRAWINGS

FIG. 2 is a flowchart illustrating a method for performing push processing on a blockchain event stream by distributed event processing centers according to an example implementation;

FIG. 3 is a schematic diagram illustrating push processing performed by distributed event processing centers on a blockchain event stream according to an example implementation;

DETAILED DESCRIPTION

Figure 1A:
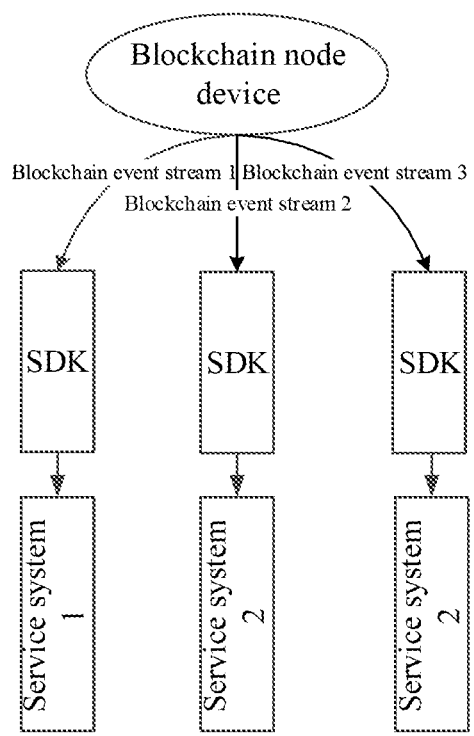
FIG. 1A is a schematic diagram illustrating push processing on a blockchain event stream according to an existing implementation.

Example implementations are described in detail herein, and examples of the example implementations are presented in the accompanying drawings. When the following descriptions relate to the accompanying drawings, unless specified otherwise, same numbers in different accompanying drawings represent same or similar elements. Implementations described in the following example implementations do not represent all implementations consistent with one or more implementations of the present specification.

It should be noted that in another implementation, steps of a corresponding method are not necessarily performed in a sequence shown and described in the present specification. In some other implementations, the method can include steps more or fewer than those described in the present specification. In addition, a single step described in the present specification can be divided into a plurality of steps for description in another implementation. However, a plurality of steps described in the present specification can also be combined into a single step for description in another implementation.

A blockchain or a blockchain network described in the present specification can be specifically a P2P network system that has a distributed data storage structure and that is implemented by node devices by using a consensus mechanism. Ledger data in the blockchain is distributed in "blocks" that are connected to each other in terms of time. A subsequent block can include a data digest of a previous block, and full backup of data on all or some nodes is implemented based on a specific consensus mechanism (for example, POW, POS, DPOS, or PBFT).

Real data generated in the physical world can be constructed into a transaction under a standard transaction format supported by the blockchain, and then published to the blockchain. A node device in the blockchain performs consensus processing on a received transaction. After a consensus is reached, a node device that serves as an accounting node in the blockchain packages the transaction into a block, and performs persistence storage in the blockchain.

Regardless of which consensus algorithm is used in the blockchain, the accounting node can package the received transaction to generate a newest block, and send the generated newest block to another node device for consensus verification. After receiving the newest block, if verifying that there is no problem, the other node device can add the newest block to the end of the original blockchain, to complete a blockchain accounting process. When verifying the new block sent by the accounting node, the other node can also execute a transaction included in the block.

It should be noted that, each time a newest block is generated in the blockchain, after a transaction in the newest block is executed, a state corresponding to the executed transaction in the blockchain changes accordingly. For example, in a blockchain constructed by using an account model, an account state of an external account or a smart contract account usually changes accordingly as a transaction is executed.

For example, after a "transfer transaction" in a block is executed, balances of a transfer-out account and a transfer-in account, for example, field values of balance fields of the accounts that are related to the "transfer transaction" usually change accordingly.

For another example, a "smart contract invoking transaction" in a block is used to invoke a smart contract deployed in the blockchain. The smart contract is invoked in an EVM corresponding to the node device, to execute the "smart contract invoking transaction," and update a data state corresponding to the smart contract invoking transaction based on an execution result.

In practice, a public chain, a private chain, or a consortium chain each may provide functions of a smart contract. The smart contract on the blockchain is a contract that can be triggered by a transaction for execution on the blockchain. The smart contract can be defined in a form of codes.

After the smart contract is created, a contract account corresponding to the smart contract appears on the blockchain and has a specific address. Contract codes and account storage are stored in account storage of the contract account. A behavior in the smart contract is controlled by the contract codes, and the account storage of the smart contract keeps a contract state. In other words, the smart contract enables a virtual account including contract codes and account storage to be generated on the blockchain.

The smart contract can be executed independently on each node in the blockchain network by using a specified method, and all execution records and data are stored on the blockchain. Therefore, after such a transaction is executed, transaction credentials that cannot be tampered with and cannot be lost are stored on the blockchain. An execution result of the smart contract can be stored in a Merkle Patricia Trie (MPT) receipt tree in a form of a transaction execution log, or can be stored in a storage tree of the smart contract in a form of a key-value pair.

Various events are generated when a user uses the blockchain. For example, a new block is generated after a network consensus is reached. The user initiates a transaction by using a software development kit (SDK) and writes the transaction into a ledger. Alternatively, the user invokes a function of a certain smart contract to perform a specific operation. These events are of great value to an external service system. The external service system can process the information, and feedback a processing result to an actual service. For example, a change of a certain account balance on the blockchain is monitored by subscribing to a specific event. Alternatively, a block mining speed, a transaction speed, etc., in the blockchain network are monitored by subscribing to a specific event.

In practice, there is generally a plurality of service systems expecting to subscribe to an event from a blockchain node: When initiating a transaction, the SDK subscribes to an event to determine whether the transaction is successfully executed and written into the ledger. A monitoring system subscribes to an event to monitor counter data such as the block mining speed and the number of transactions in the blockchain network. A service system performs different operations based on a change of a specific state on the blockchain.

The SDK of the blockchain network usually provides a subscription interface for an event. For example, an SDK of HyperLedger Fabric provides subscription interfaces for a block, a transaction, and a contract event. The technician can directly push a subscribed event to an external service based on service logic by using the SDK. As shown in FIG. 1A, when the event needs to be pushed to a plurality of external service systems, a plurality of subscription event streams can be generated by using the SDK, and are pushed to corresponding external service systems. When an event is processed by using the method, a new event stream is created each time a new external service system is added, and traffic at a network ingress increases.

Figure 1B:
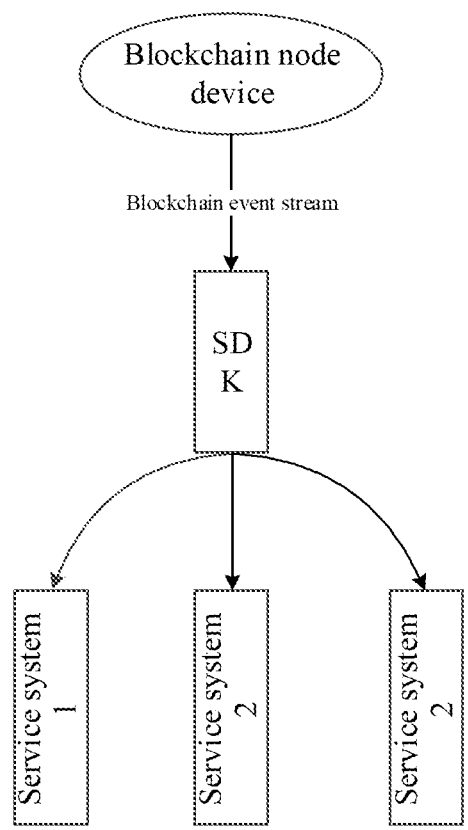
FIG. 1B is a schematic diagram illustrating push processing on a blockchain event stream according to another existing implementation.

In an example solution, as shown in FIG. 1B, one subscription event stream is used to push received events to each external service system. When an event is processed by using the method, network traffic does not increase as the amount of service of external service systems increases. This can significantly reduce network traffic overheads. However, this solution has a disadvantage. An overall event push speed depends on an external service system with the lowest processing speed. When an external service system processes an event slowly, event processing speeds of other service systems decrease accordingly. A reason is that the external service systems share one event stream.

In view of these, one or more implementations of the present specification provide a blockchain event push method, applied to a distributed event processing center corresponding to a node device of a blockchain network. Each event processing center includes several triggers that are used to push a blockchain event to corresponding service systems.

The distributed event processing center in one or more implementations of the present specification can include a plurality of event processing centers. The plurality of event processing centers can be disposed inside the node device, or can be disposed outside the node device, and are connected to the node device. Alternatively, the plurality of event processing centers can be partially disposed inside the node device, and partially disposed outside the node device.

In an illustrative implementation, the event processing center is an event processing component bound to the node device, for example, an SDK component. Each event processing center can obtain a blockchain event stream from the node device, and push a blockchain event in the obtained blockchain event stream to several service systems connected to the event processing center.

For example, each event processing center in the distributed event processing center includes several triggers corresponding to the service systems. The "trigger" in implementations provided in the present specification can include an event trigger and push process running in an event processing center. The event trigger and push process is responsible for determining whether a blockchain event included in a blockchain event stream meets a predetermined trigger condition for pushing, and when the blockchain event included in the blockchain event stream meets the corresponding trigger condition, the blockchain event is pushed to a service system connected to the event trigger and push process, for example, the trigger. Therefore, the trigger or the event trigger and push process in implementations of the present specification corresponds to a service system connected to the trigger or the process, that is, each trigger or each event trigger and push process declares a trigger condition of a service system corresponding to the trigger or the event trigger and push process. Each trigger can correspond to a service system to execute a push service for a blockchain event subscribed to by the service system. In some cases, a plurality of triggers can correspond to the same service system, but are responsible for executing blockchain events that are subscribed to by the service system and that meet or under different conditions.

Content of the trigger condition is not specifically limited in the present specification, and the trigger condition can further include unconditional triggering of any blockchain event or conditional triggering of a blockchain event. The conditional triggering of the blockchain event can include a blockchain event subscription condition of each service system. For example, a first service system needs to subscribe to an event to determine whether a transaction initiated by the first service system is successfully executed and written into a ledger. In this case, a trigger condition (or a subscription condition) of the first service system includes a transaction sent by the first service system. A second service system needs to subscribe to an event to monitor counter data such as a block mining speed and the number of transactions in the blockchain network. In this case, a trigger condition (or a subscription condition) of the second service system can include a new block event on the blockchain and a transaction recording event on the blockchain. A third service system needs to perform a corresponding operation based on a change of an execution state of a specific smart contract on the blockchain. In this case, a trigger condition (or a subscription condition) of the third service system can include a state of an execution result of the smart contract with a specific address.

As shown in FIG. 2, a blockchain event push method provided in this implementation includes the following steps.

Step 202: Distributed event processing centers obtain respective blockchain event streams from a node device.

The blockchain event stream can include blockchain events sorted based on a predetermined condition, such as a sequence of event generation times, and new blockchain events can be continuously generated as a block height increases, thereby forming the "blockchain event stream." It should be noted that the blockchain event stream can include a blockchain event stream that is generated by the node device by parsing data content stored on the blockchain and that starts from an initial or start subscription location of any newly created event processing center, or can include a "blockchain stream" that is directly pulled by an event processing center from the node device and that meets an initial subscription location of the event processing center when the event processing center is created. As the event processing center locally continuously parses the obtained block stream, an event stream including blockchain events can be generated. Specific content of the blockchain event stream is not limited in the present specification.

In this implementation, as shown in FIG. 3, each event processing center in the distributed event processing centers can obtain a blockchain event stream of the event processing center from the node device. When each event processing center is initialized, start or initial locations of the blockchain event streams obtained by the event processing centers from the node device can be the same, for example, all the streams start from a genesis block, or can be different, for example, service systems corresponding to some event processing centers start the blockchain event subscription from block 100, and service systems corresponding to some event processing centers start the blockchain event subscription from block 1000. This is not limited in the present specification.

Step 204: The distributed event processing centers deliver the respective obtained blockchain event streams to respective triggers included in the distributed event processing centers, to push a blockchain event included in the blockchain event streams to a service system corresponding to a trigger of the triggers when the blockchain event meets a trigger condition in the trigger, where a difference between a maximum, e.g., the highest, push speed and a minimum, e.g., the lowest, push speed of all triggers on blockchain events that are included in an event processing center of the distributed event processing centers is less than a predetermined first threshold.

In this implementation, as shown in FIG. 3, event processing centers 1, 2, and 3 each can include a plurality of triggers, and the plurality of triggers share the same blockchain event stream. To enable the plurality of triggers in each event processing center to have comparable push speeds in a process such as determining, triggering, and pushing the blockchain event stream, and avoid wasting computing resource caused by a trigger with a high push speed having to wait for a trigger with a low push speed for a long time after the trigger processes a certain blockchain event, a difference between a maximum, e.g., the highest, push speed and a minimum, e.g., the lowest, push speed of all triggers on the blockchain events that are included in the event processing center is less than the predetermined first threshold.

The following provides a method for calculating push speeds of a plurality of triggers in an illustrative implementation: Because a plurality of triggers included in one event processing center share a blockchain event stream delivered by the event processing center, within a predetermined duration, the respective total numbers of blockchain events processed by each of all the triggers of the event processing center are equal. For example, within the predetermined duration, event processing center 1 obtains M blockchain events from the node device, and delivers the M blockchain events to each trigger. Event processing center 1 can record a total time Ti consumed by each trigger to push an event to a service system within the predetermined duration, the total number N of events pushed by the trigger to the service system connected to the trigger, and a push speed Vi=N/Ti of each trigger, for example, triggers 1, 2, 3, and 4, to conveniently calculate a difference between a maximum, e.g., the highest, push speed and a minimum, e.g., the lowest, push speed of all the triggers on the blockchain events.

The push speed of each trigger on the blockchain events is related to a configuration or a processing speed of the service system connected to the trigger. In addition, the push speed is also affected by a network connection status between the event processing center and the service system.

In an illustrative implementation, to prevent the push speed of each trigger from being affected by a sudden change of the network connection status or the processing speed of the service system, a cache event queue can be set for each trigger of the event processing center. After receiving the blockchain event stream, the event processing center sequentially writes events into cache queues of all the triggers in the event processing center within the predetermined duration, and the triggers read the events from the respective cache queues and push the events to external service systems.

A plurality of triggers are disposed in the same event processing center, where a difference among push speeds of the triggers is less than the predetermined first threshold. It can be ensured that a plurality of triggers with comparable push speeds trigger and push an event in the same event processing center. This effectively avoids wasting resources caused by a trigger with a high push speed having to wait for a trigger with a low push speed for a long time, and improves event push efficiency of the event processing center. In addition, the plurality of triggers shares the same blockchain event stream in the same event processing center. Compared with a setting that each trigger uses one blockchain event stream, network traffic overheads are effectively reduced, and network setting costs are reduced.

To manage blockchain event processing and push processes of the distributed event processing centers, the present specification provides two specific management methods: The distributed event processing centers are managed by using centralized control components, and the centralized control components are separately communicatively connected to the distributed event processing centers. Alternatively or additionally, a distributed control component that is loaded in each event processing center in the distributed event processing centers and that is constructed by using codes performs self-distributed management on the distributed event processing centers, that is, the control components are distributed control components that are separately disposed in the distributed event processing centers, and each event processing center is directly or indirectly communicatively connected to another event processing center. The following content of the present specification describes the two implementations in detail. A person skilled in the art can further set another management method for the distributed event processing centers based on the two implementations. This is not limited in the present specification.

In an illustrative implementation, centralized control components that manage the distributed event processing centers can be disposed inside the node device, or can be outside and connected to the node device. The control component can receive a report of a delivery progress of each event processing center on a respective blockchain event stream, and provide an operation instruction such as establishing a new event processing center, combining existing event processing centers, creating a new trigger, or deleting a trigger.

The delivery progress of each event processing center on the respective blockchain event stream can include a location, in the blockchain, of a newest blockchain event delivered by each event processing center to the trigger. For example, the location can be represented as a block height corresponding to the newest blockchain event delivered to the trigger, or a block height and a transaction sequence number that correspond to the blockchain event.

Figure 4A:
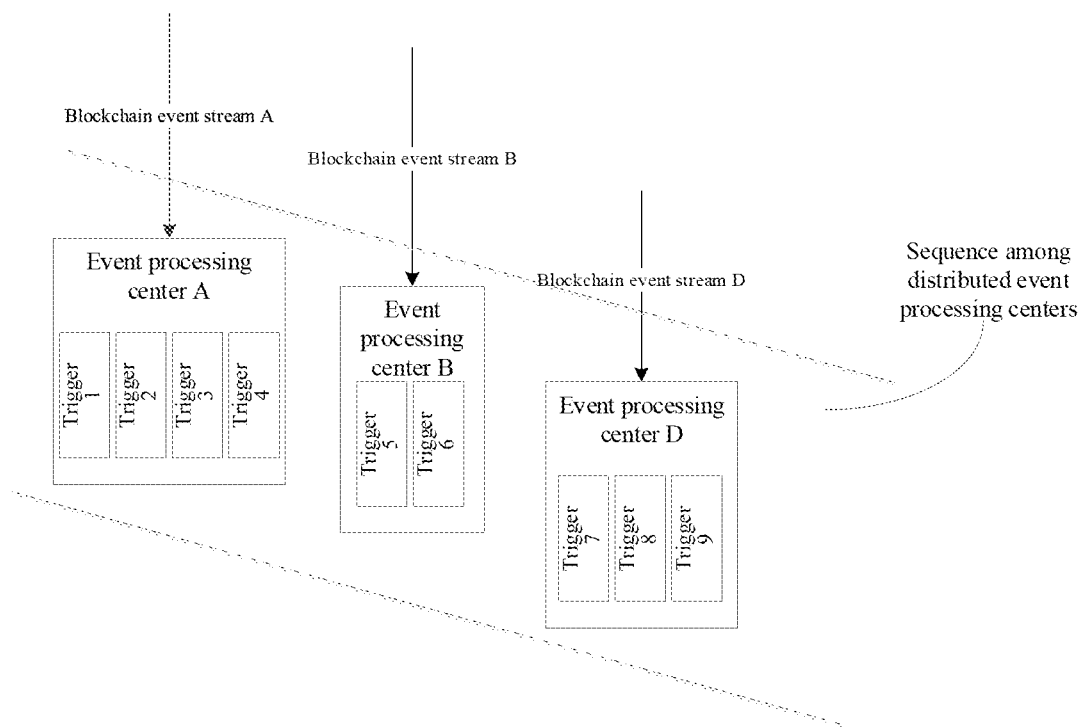
FIG. 4A is a schematic diagram illustrating push processing performed by a distributed event processing center sequence on a blockchain event stream according to an example implementation.

For further convenience of management, as shown in FIG. 4A, the control component can establish a sequence among the distributed event processing centers by sorting the distributed event processing centers level by level based on the delivery progress of each event processing center on the respective blockchain event stream. A delivery progress of a parent event processing center on a blockchain event stream of the parent event processing center is greater than a delivery progress of a child event processing center of the parent event processing center on a blockchain event stream the child event processing center. That is, a location of a blockchain event that is being delivered and processed by the parent event processing center in the blockchain event stream is newer than a location of a blockchain event that is being delivered and processed by the child event processing center in the blockchain event stream. For example, the delivery progress of the parent event processing center is block 1001, and the delivery progress of the child event processing center is block 1000.

Each event processing center obtains the blockchain event stream from the node device, and delivers the blockchain event stream to each trigger of the event processing center. Therefore, the delivery progress of each event processing center on the respective blockchain event stream is related to a creation time of the event processing center, a start or initial subscription location of the event processing center, and an average push speed of several triggers included in the event processing center.

In an example service use, because a push speed of a trigger may be affected by factors such as a network communication status between an event processing center and a service system corresponding to the trigger, the push speed of the trigger may change significantly, so that a difference among push speeds of a plurality of triggers included in the event processing center exceeds a predetermined threshold.

Figure 4B:
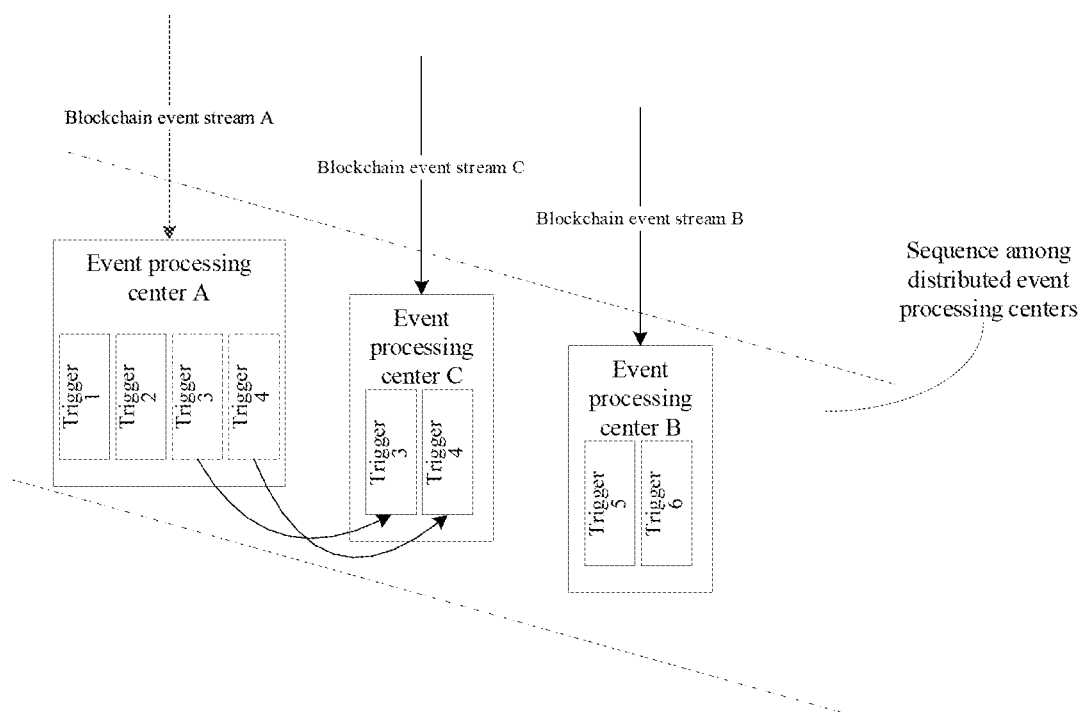
FIG. 4B is a schematic diagram illustrating a split process of distributed event processing centers according to an example implementation.

In an illustrative implementation, each event processing center can calculate a push speed of each trigger included in the event processing center on the respective blockchain event stream. As shown in FIG. 4B, if a difference between a push speed of at least one trigger, for example, triggers 3 and 4, in event processing center A and a speed of a trigger with a highest push speed is greater than the predetermined first threshold, after receiving a report, from the event processing center, of push speeds or a difference among push speeds of the triggers included in the event processing center, the control component can send an instruction for establishing a new event processing center and a trigger movement instruction, to establish new event processing center C between event processing center A and child event processing center B of event processing center A, and move the at least one trigger, for example, triggers 3 and 4, to new event processing center C to continue to process the blockchain event stream. In this case, an initial delivery progress of new event processing center C can be the same as a delivery progress of event processing center A. However, because the push speeds of triggers 3 and 4 are relatively low, after a specific time, the delivery progress of event processing center C is less than the delivery progress of event processing center A.

In the implementation above, new child event processing center C is established for event processing center A, and triggers 3 and 4 having push speeds that are different from a maximum, e.g., the highest, push speed by an amount greater than the first threshold are moved to new child event processing center C. It can be inferred that, in an illustrative implementation, the control component can further establish a new parent event processing center for event processing center A, and triggers 1 and 2 having push speeds that are different from a minimum, e.g., the lowest, push speed by an amount greater than the first threshold can be moved to the new parent event processing center. A specific process is similar to the implementation above. Details are omitted herein for simplicity.

It should be noted that, in FIGS. 4A, 4B, 4C and FIGS. 5A, 5B, 5C in the present specification, a service system corresponding to the trigger is omitted. Because a trigger condition of a service system connected to a trigger is set in the trigger, in some implementations, moving the trigger from one event processing center to another event processing center in each implementation of the present specification includes moving an event push service provided by the service system corresponding to the trigger from one event processing center to another event processing center.

The process above can be referred to as "split" of an event processing center. A push speed of each trigger in the distributed event processing centers is monitored, and the corresponding "split" process is executed, so that a plurality of triggers in each event processing center have comparable speeds, e.g., a speed difference does not exceed the predetermined threshold. However, due to a network status and other factors, although the plurality of triggers in each event processing center have comparable speeds, at a certain moment, an average speed of triggers included in a parent event processing center may be still less than an average speed of triggers included in a child event processing center of the parent event processing center. After a period of event processing, a delivery progress of the parent event processing center on a blockchain event stream of the parent event processing center may be less than a delivery progress of the child event processing center of the parent event processing center.

Figure 4C:
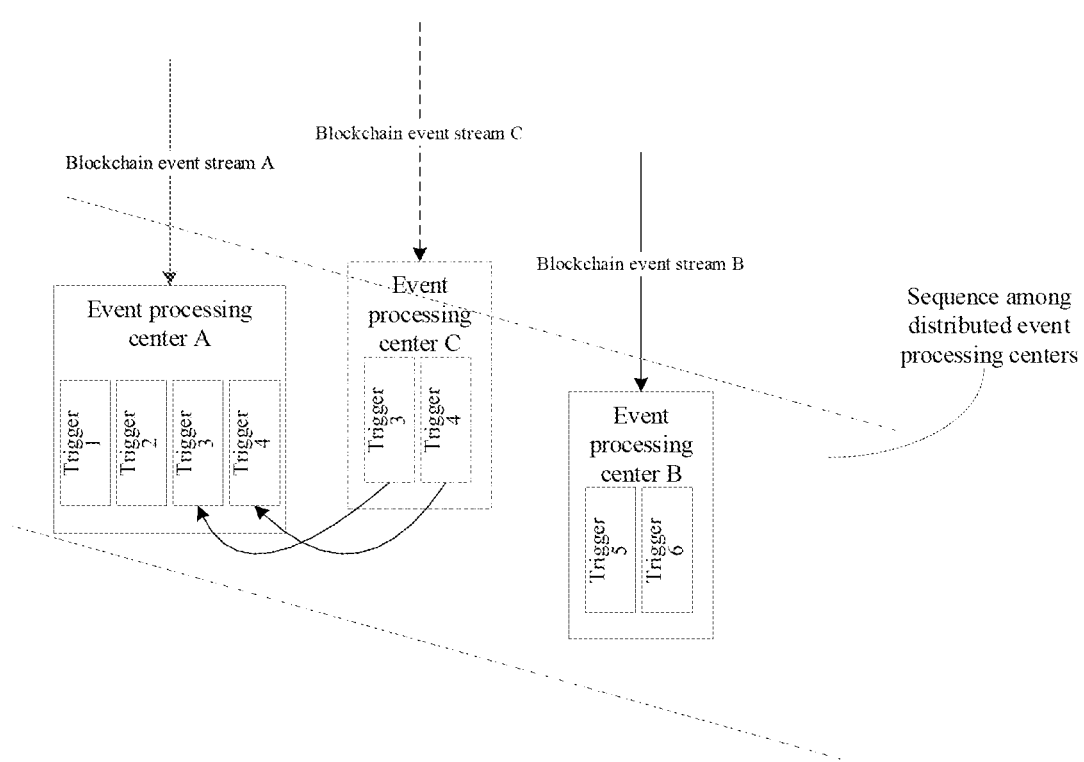
FIG. 4C is a schematic diagram illustrating a combination process of distributed event processing centers according to an example implementation.

The control component can monitor in real time or obtain the delivery progress of each event processing center in the distributed event processing centers at an interval of a predetermined cycle. In an illustrative implementation, as shown in FIG. 4C, for two adjacent event processing centers A and C, if a second delivery progress of child event processing center C on a blockchain event stream of child event processing center C is not less than a first delivery progress of parent event processing center A on a blockchain event stream of parent event processing center A, the control component can move all triggers 3 and 4 in child event processing center C to the parent event processing center, and delete child event processing center C from the sequence among the distributed event processing centers.

The process above can be considered as a "combination" of event processing centers. In the combination process, the number of event processing centers included in the distributed event processing centers is reduced, and network traffic overheads of the distributed event processing centers are effectively reduced. In addition, a plurality of event processing centers are combined, so that delivery progresses in the sequence among the distributed event processing centers can be in descending order.

After child event processing center C and parent event processing center A are combined, the control component can continue to monitor push speeds or a difference among push speeds of all triggers included in new parent event processing center A obtained after the combination. If a difference between a push speed of at least one trigger and a speed of a trigger with a highest push speed is greater than the predetermined threshold, "split" of the event processing center should continue to be executed, to establish a new event processing center between event processing center A and child event processing center B of event processing center A, and move the at least one trigger to the new event processing center to process the blockchain event stream.

The control component can monitor the delivery progress of each event processing center in the distributed event processing centers, and execute the corresponding "combination" process, to establish, based on the delivery progress of each event processing center, a sequence among the distributed event processing centers with delivery progresses that are in descending order or in ascending order. The control component monitors the difference among the push speeds of all the triggers in each event processing center, and executes the corresponding "split" process, to ensure that all the triggers in each event processing center have comparable push speeds. Therefore, when each event processing center actually pushes blockchain events to each service system, through continuous "split" and "combination," a sequence among the distributed event processing centers can be established, where each event processing center includes several triggers with comparable speeds and delivery progresses on the blockchain event stream are in descending order or in ascending order. This improves blockchain event push efficiency, and saves network traffic of the distributed event processing centers.

In an illustrative implementation, to further reduce network traffic overheads of the distributed event processing centers, and facilitate combination of more event processing centers, when the control component monitors in real time or obtains the delivery progress of each event processing center in the distributed event processing centers at an interval of a predetermined cycle, as shown in FIG. 4C, for two adjacent event processing centers A and C, if the second delivery progress of child event processing center C is less than the first delivery progress of parent event processing center A, and a difference between the second delivery progress and the first delivery progress is less than a predetermined second threshold, for example, less than a unit threshold (such as ten transactions) within a predetermined time (such as 3 minutes), parent event processing center A is suspended from delivering the blockchain event stream to each trigger of parent event processing center A. In this case, child event processing center C continues to deliver and push the blockchain event stream. When the second delivery progress catches up the first delivery progress, e.g., when the second delivery progress becomes not less than the first delivery progress, the "combination" process described in the implementation above can be triggered. That is, all triggers 3 and 4 included in child event processing center C are moved to parent event processing center A, and child event processing center C is removed. This implementation sets no specific limitation on a restart occasion of parent event processing center A obtained after the combination. For example, after triggers 3 and 4 are moved, or when a suspension instruction of the control component on parent event processing center A expires, parent event processing center A obtained after the combination can be restarted to deliver the blockchain event stream.

In an illustrative implementation, when an event processing center in the sequence among the distributed event processing centers does not have any trigger, for example, all service systems originally corresponding to the event processing center stop blockchain event subscription, all triggers corresponding to the service systems are removed, and subscription combination also needs to be performed. In essence, the event processing center is removed.

In the following implementations, the control component is disposed in each event processing center of the distributed event processing centers, and therefore, distributed control components of event processing centers are established.

Figure 5A:
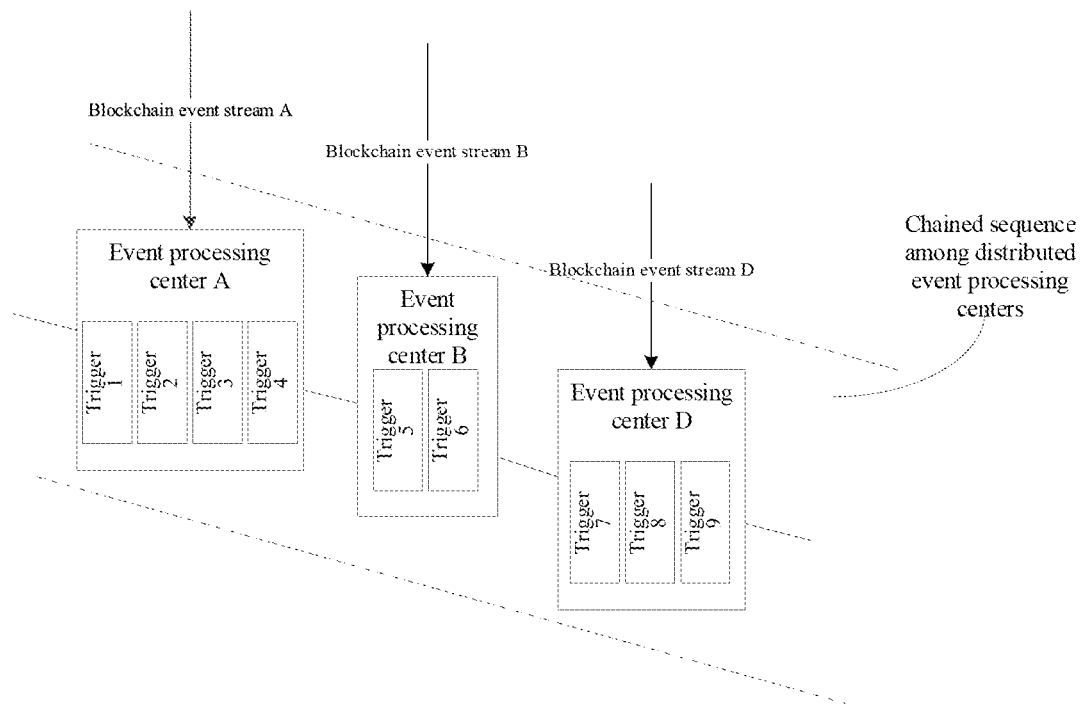
FIG. 5A is a schematic diagram illustrating push processing performed by a chained distributed event processing center sequence on a blockchain event stream according to an example implementation.

As shown in FIG. 5A, for ease of distributed management, the distributed control components can establish a chained sequence among the distributed event processing centers by sorting the distributed event processing centers level by level based on the delivery progress of each event processing center on the respective blockchain event stream. A delivery progress of a parent event processing center on a blockchain event stream of the parent event processing center is greater than a delivery progress of a child event processing center of the parent event processing center on a blockchain event stream of the child event processing center, and each event processing center maintains a connection to an adjacent event processing center.

Each event processing center obtains the blockchain event stream from the node device, and delivers the blockchain event stream to each trigger of the event processing center. Therefore, the delivery progress of each event processing center on the respective blockchain event stream is related to a creation time of the event processing center, an initial or start subscription location, and an average push speed of several triggers included in the event processing center. The delivery progress on the respective blockchain event stream can be represented as a location, in the blockchain event stream, of a newest blockchain event delivered by the event processing center (or the trigger included in the event processing center). For example, a delivery progress of a certain event processing center is a block with a block height of 1000, or a delivery progress of a certain event processing center is a transaction that is in a block with a block height of 1000 and that has a serial number of 10.

In actual service use, because a push speed of a trigger may be affected by factors such as a network communication status between an event processing center and a service system corresponding to the trigger, the push speed of the trigger may change significantly, so that a difference among push speeds of a plurality of triggers included in the event processing center exceeds a predetermined threshold.

Figure 5B:
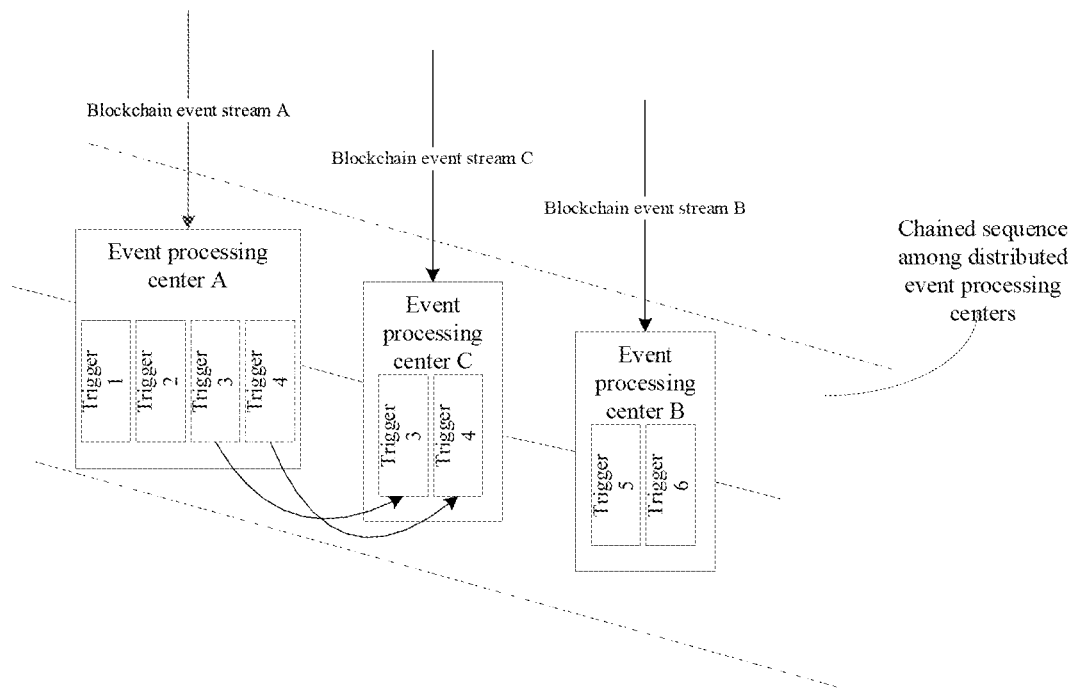
FIG. 5B is a schematic diagram illustrating a split process of distributed event processing centers according to an example implementation.

In an illustrative implementation, each event processing center can calculate a push speed of each trigger included in the event processing center on the respective blockchain event stream. As shown in FIG. 5B, if a difference between a push speed of at least one trigger, for example, triggers 3 and 4, in event processing center A and a speed of a trigger with a highest push speed is greater than the predetermined first threshold, a distributed control component configured for event processing center A can send an instruction for establishing a new event processing center and a trigger movement instruction, to establish new event processing center C between event processing center A and child event processing center B of event processing center A, and cooperate with a distributed control component configured for new event processing center C to move the at least one trigger, for example, triggers 3 and 4, to new event processing center C to continue to deliver and process the blockchain event stream.

Because a trigger condition of a service system connected to a trigger is set in the trigger, in some implementations, moving the trigger from one event processing center to another event processing center in each implementation in the present specification includes moving an event push service provided by the service system corresponding to the trigger from one event processing center to another event processing center.

The process above can be referred to as "split" of an event processing center. The control component configured for each event processing center monitors a push speed of each trigger in the event processing center, and executes the corresponding "split" process, so that a plurality of triggers in each event processing center have comparable speeds, e.g., a speed difference does not exceed the predetermined threshold. However, due to a network status and other factors, although the plurality of triggers in each event processing center have comparable speeds, at a certain moment, an average speed of triggers included in a parent event processing center may be still less than an average speed of triggers included in a child event processing center of the parent event processing center. After a period of event processing, a delivery progress of the parent event processing center on a blockchain event stream of the parent event processing center may be less than a delivery progress of the child event processing center of the parent event processing center.

Figure 5C:
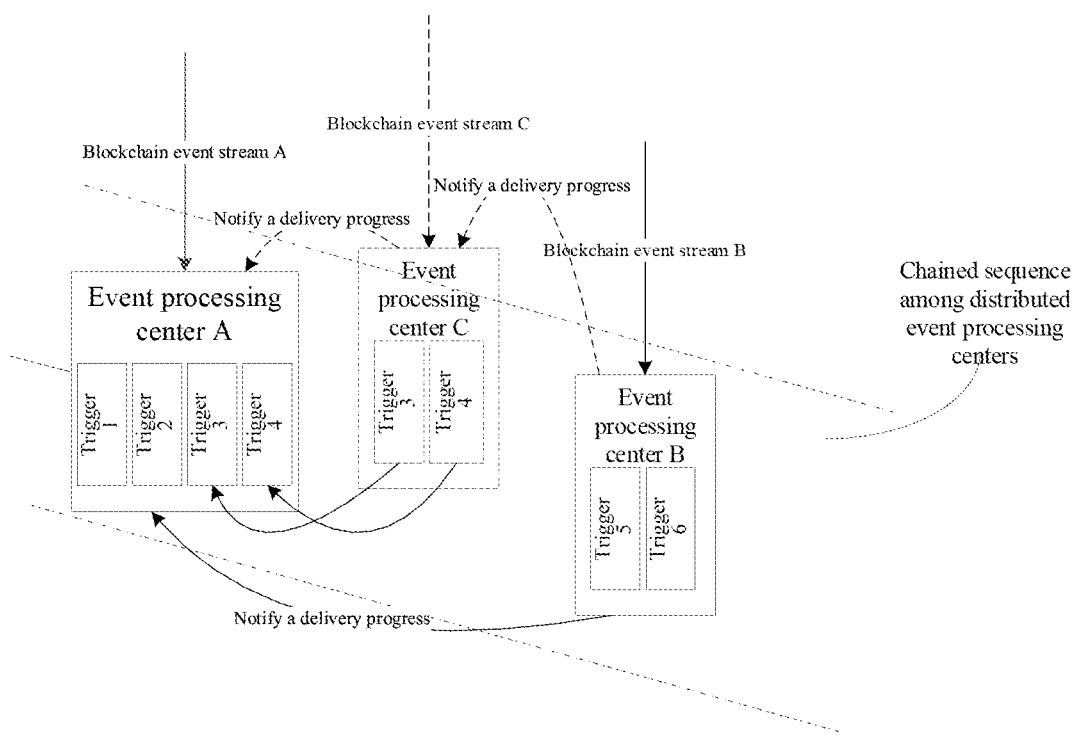
FIG. 5C is a schematic diagram illustrating a combination process of distributed event processing centers according to an example implementation.

In an illustrative implementation, as shown in FIG. 5C, each child event processing center can report a delivery progress of the child event processing center to a parent event processing center of the child event processing center at an interval of a predetermined cycle. If a control component of parent event processing center A learns, through comparison, that a second delivery progress of child event processing center C on a blockchain event stream of child event processing center C is not less than a first delivery progress of parent event processing center A on a blockchain event stream of parent event processing center A, control components of parent event processing center A and child event processing center C can cooperate with each other in processing, to move all triggers 3 and 4 in child event processing center C to parent event processing center A, and delete child event processing center C from the sequence among the distributed event processing centers. Afterwards, event processing center A serves as a parent event processing center of event processing center B, and receives a report of a delivery progress of event processing center B.

The process above can be considered as "combination" of event processing centers. In the combination process, the number of event processing centers included in the distributed event processing centers is reduced, and network traffic overheads of the distributed event processing centers are effectively reduced.

After child event processing center C and parent event processing center A are combined, the control component of newly generated distributed event processing center A can continue to monitor push speeds of all triggers included in the event processing center. If a difference between a push speed of at least one trigger and a speed of a trigger with a highest push speed is greater than the predetermined threshold, "split" of the event processing center can continue to be executed, to establish a new event processing center between event processing center A and child event processing center B of event processing center A, and move the at least one trigger to the new event processing center to process the blockchain event stream.

In the sequence among the distributed event processing centers above, a parent event processing center receives a report of a delivery progress of a child event processing center, and trigger the "combination" process when finding that the delivery progress of the child event processing center is not less than a delivery progress of the parent event processing center on a blockchain event stream of the parent event processing center, to establish, based on the delivery progress of each event processing center, a sequence among the distributed event processing centers with delivery progresses that are in descending order or in ascending order. Each event processing center monitors the difference between the push speeds of all the triggers in the event processing center, and executes the corresponding "split" process, to ensure that all the triggers in each event processing center have comparable push speeds. Therefore, when each event processing center actually pushes blockchain events to each service system, through continuous "split" and "combination," a sequence among the distributed event processing centers can be established, where each event processing center includes several triggers with comparable speeds and delivery progresses on the blockchain event stream are in descending order or in ascending order. This improves blockchain event push efficiency, and saves network traffic of the distributed event processing centers.

In an illustrative implementation, to further reduce network traffic overheads of the distributed event processing centers, and facilitate combination of more event processing centers, as shown in FIG. 5C, when the control component of parent event processing center A monitors in real time or obtains, at an interval of a predetermined cycle, a report that is of a delivery progress and that is sent by child event processing center C, if parent event processing center A learns that the second delivery progress of child event processing center C is less than the first delivery progress of parent event processing center A, and a difference between the second delivery progress and the first delivery progress is less than a predetermined second threshold, for example, less than a unit threshold (such as ten transactions) within a predetermined time (such as 3 minutes), the control component of parent event processing center A suspends a blockchain event stream delivery process of event processing center A. In this case, child event processing center C continues to deliver and push the blockchain event stream. When the second delivery progress catches up the first delivery progress, e.g., when the second delivery progress becomes not less than the first delivery progress, the "combination" process described in the implementation above can be triggered. That is, all triggers 3 and 4 included in child event processing center C are moved to parent event processing center A, and child event processing center C is removed. This implementation sets no specific limitation on a restart occasion of parent event processing center A obtained after the combination. For example, after triggers 3 and 4 are moved, or when a suspension instruction of the control component of parent event processing center A on parent event processing center A expires, parent event processing center A obtained after the combination can be restarted to deliver the blockchain event stream.

In an illustrative implementation, when an event processing center in the sequence among the distributed event processing centers does not have any trigger, the event processing center also needs to be combined with a parent event processing center of the event processing center, for example, all service systems originally corresponding to the event processing center stop blockchain event subscription. Correspondingly, all triggers corresponding to the service systems are removed. In this case, combining event processing centers is actually removing the event processing center. If the event processing center has no parent event processing center, the event processing center is directly removed, and a child event processing center of the event processing center serves as a new highest parent event processing center located at an endpoint of the sequence among the distributed event processing centers.

It can be learned from the implementations that, regardless of whether the control component of the distributed event processing centers includes centralized control components or distributed control components, the sequence among the distributed event processing centers with delivery progresses that are in descending order can be established based on the delivery progress of each processing center on the respective blockchain event stream. When receiving a subscription requirement of a new service system, the node device can notify the control component to create a new event processing center in the sequence among distributed event processing centers to connect to the new service system. If the subscription requirement specifies start/initial location information of a subscribed blockchain event stream, a new trigger can be created in the new event processing center. The trigger declares a start or initial location of the blockchain event stream subscribed to by the new service system corresponding to the trigger, and the new event processing center is inserted into the sequence as a parent node of a first event processing center having a delivery progress that is less than the start or initial location. After the insertion ends, a new trigger included in the newly inserted event processing center gradually participates in an event processing center including a trigger with a push speed comparable to that of the trigger based on the combination or split process of the blockchain event processing centers in the one or more implementations.

An implementation of the present specification further provides a blockchain event processing apparatus 60. The apparatus 60 can be implemented by using software, or can be implemented by using hardware or a combination of software and hardware. Software implementation is used as an example. As a logical apparatus, the apparatus is formed by reading a corresponding computer program instruction to a memory for running by a central process unit (CPU) of a device in which the apparatus is located. In terms of hardware, in addition to the CPU, the memory, and the storage device shown in FIG. 7, the device in which the apparatus is located usually further includes other hardware such as a chip used for sending/receiving a radio signal, and/or other hardware such as a board used for implementing a network communication function.

Figure 6:
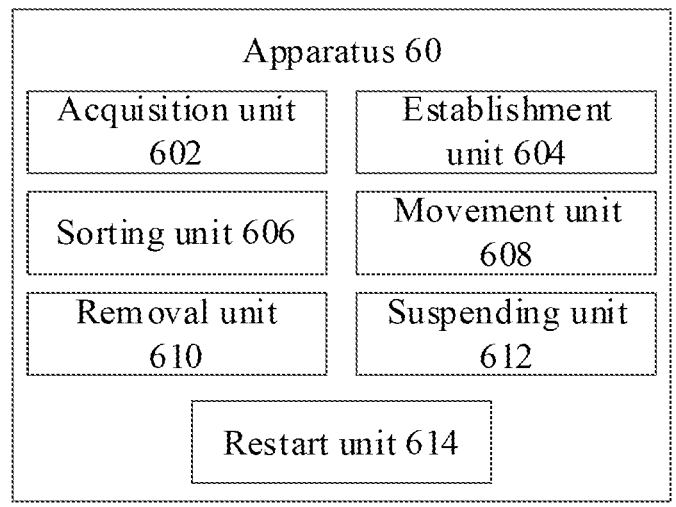
FIG. 6 is a schematic diagram illustrating a blockchain event processing apparatus applied to a node of a control component according to an example implementation.

As shown in FIG. 6, the present specification further provides a blockchain event processing apparatus 60, applied to a control component of distributed event processing centers connected to a node device of a blockchain network. The distributed event processing centers obtain respective blockchain event streams from the node device, and deliver the obtained respective blockchain event streams to respective triggers included in the distributed event processing centers, to push a blockchain event included in the blockchain event streams to a service system corresponding to a trigger of the triggers when the blockchain event meets a trigger condition in the trigger.

The apparatus 60 includes: an acquisition unit 602, configured to obtain push speeds of a plurality of triggers included in an event processing center of the distributed event processing centers; and an establishment unit 604, configured to: if a difference among the push speeds of the plurality of triggers is greater than a predetermined first threshold, establish a new event processing center, and move, to the new event processing center, a trigger having a push speed that is different from a highest push speed of the push speeds by an amount greater than the first threshold, or a trigger having a push speed that is different from a lowest push speed of the push speeds by an amount greater than the first threshold.

In an illustrative implementation, the apparatus 60 further includes: a sorting unit 606, configured to establish a sequence among the distributed event processing centers by sorting the distributed event processing centers level by level based on a delivery progress of each event processing center on a respective blockchain event stream, where a delivery progress of a parent event processing center on a blockchain event stream of the parent event processing center is greater than a delivery progress of a child event processing center of the parent event processing center on a blockchain event stream of the child event processing center.

In an illustrative implementation, the establishment unit 604 is further configured to: establish a new child event processing center for the event processing center, and move, to the new child event processing center, the trigger having a push speed that is different from the highest push speed by an amount greater than the first threshold; or establish a new parent event processing center for the event processing center, and move, to the new parent event processing center, the trigger having a push speed that is different from the lowest push speed by an amount greater than the first threshold.

In an illustrative implementation, the acquisition unit 602 is further configured to obtain a delivery progress of each event processing center in the distributed event processing centers on a respective blockchain event stream; a movement unit 608 is configured to: if a second delivery progress of a child event processing center of a parent event processing center in the distributed event processing centers on a blockchain event stream of the child event processing center is not less than a first delivery progress of the parent event processing center on a blockchain event stream of the parent event processing center, move each trigger in the child event processing center to the parent event processing center; and a removal unit 610 is configured to remove the child event processing center.

In an illustrative implementation, the apparatus 60 further includes: a suspending unit 612, configured to: if the second delivery progress of the child event processing center is less than the first delivery progress of the parent event processing center, and a difference between the second delivery progress and the first delivery progress is less than a predetermined second threshold, suspend the parent event processing center from delivering the blockchain event stream obtained by the parent event processing center to each trigger of the parent event processing center, where the movement unit 608 is further configured to: when the second delivery progress becomes not less than the first delivery progress, move the trigger included in the child event processing center to the parent event processing center; and the removal unit 610 is further configured to remove the child event processing center; and a restart unit 614, configured to restart the parent event processing center to continue to deliver the blockchain event stream obtained by the parent event processing center to each trigger included in the parent event processing center.

In an illustrative implementation, the removal unit 610 is configured to remove an event processing center if the event processing center in the distributed event processing centers does not include any trigger.

In an illustrative implementation, the event processing center is a software development kit component coupled to the node device.

In an illustrative implementation, the establishment unit 604 is configured to create a new event processing center, the new event processing center including a new trigger, and the new trigger declaring a start or initial location of a blockchain event stream subscribed to by a service system corresponding to the new trigger; and the sorting unit 606 is configured to set the new event processing center as a parent event processing center of a first event processing center having a delivery progress that is less than the start or initial location.

In an illustrative implementation, the control component includes centralized control components, and the centralized control components are separately communicatively connected to the distributed event processing centers.

In an illustrative implementation, the control component includes distributed control components that are separately disposed in the distributed event processing centers, and each event processing center in the distributed event processing center sequence is communicatively connected to an adjacent event processing center.

For specific implementation processes of functions of units in the apparatus 60, reference can be made to the implementation process of the blockchain event processing method performed by the control component. For related parts, references can be made to parts of the method implementation descriptions. Details are omitted herein for simplicity.

The apparatus implementation described above is merely an example. The units described as separate parts can or cannot be physically separate, and parts displayed as units can or cannot be physical modules, can be located in one position, or can be distributed on a plurality of network modules. Some or all of the units or modules can be selected based on actual needs to achieve the objectives of the solutions of the present specification. A person of ordinary skill in the art can understand and implement the implementations of the present application without creative efforts.

The apparatus, unit, or module illustrated in the implementations can be implemented by computer chips, entities, or products having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Figure 7:
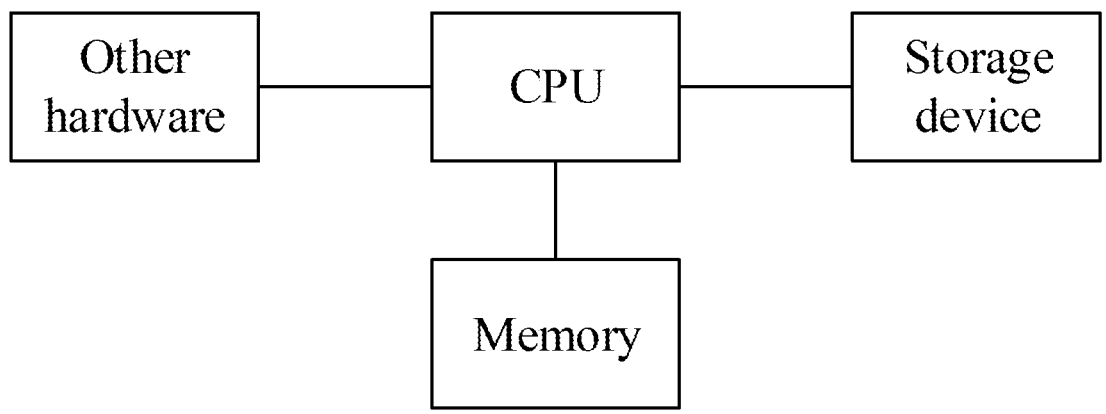
FIG. 7 is a hardware structural diagram illustrating an implementation of running a blockchain event processing apparatus according to the present specification.

Corresponding to the method implementation, an implementation of the present specification further provides a computer device. As shown in FIG. 7, the computer device includes a storage device and a processor. The storage device stores a computer program that can be run by the processor. When running the stored computer program, the processor performs the blockchain event processing method performed by the control component in the implementation of the present specification. For detailed descriptions of the blockchain event processing method performed by the control component, reference can be made to the content above. Details are omitted herein for simplicity.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 8:
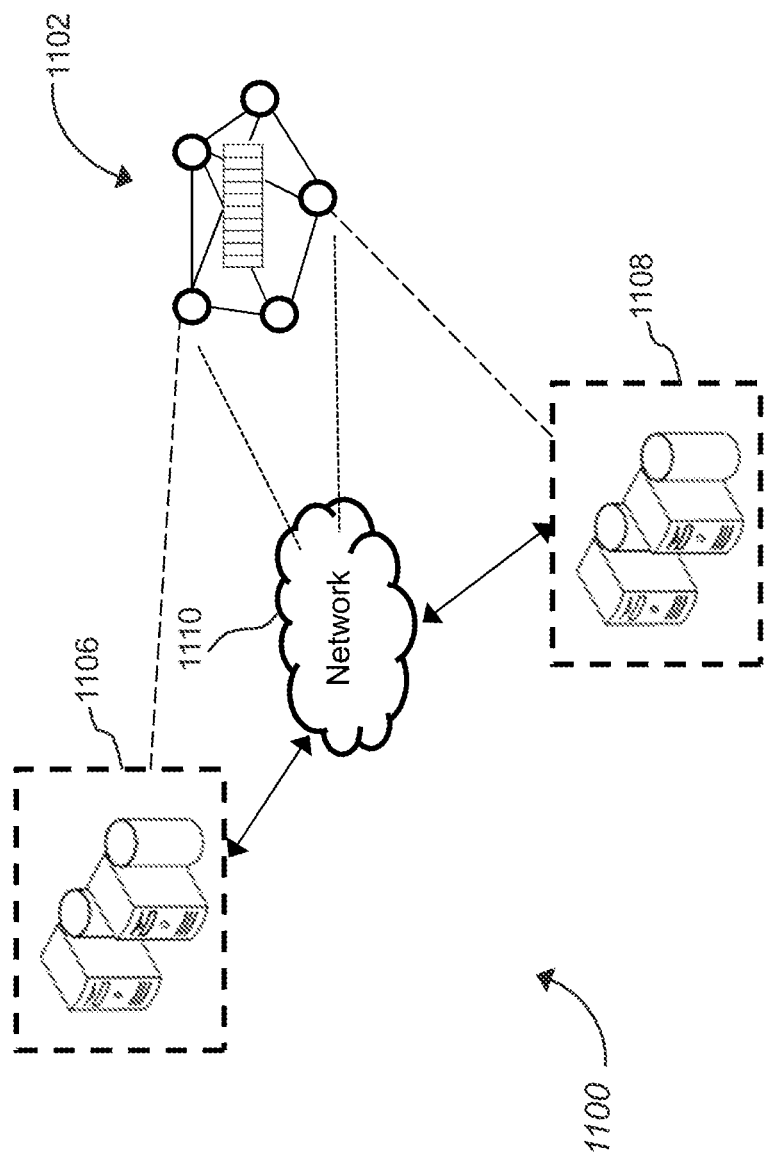
FIG. 8 is a diagram illustrating example environments that can be used to execute embodiments of this specification

FIG. 8 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 8, the consortium blockchain network 1102 is represented as a peer-to-peer network of nodes, and the computing systems 1106, 1108 provide nodes of the first entity and second entity, respectively, which participate in the consortium blockchain network 1102.

Figure 9:
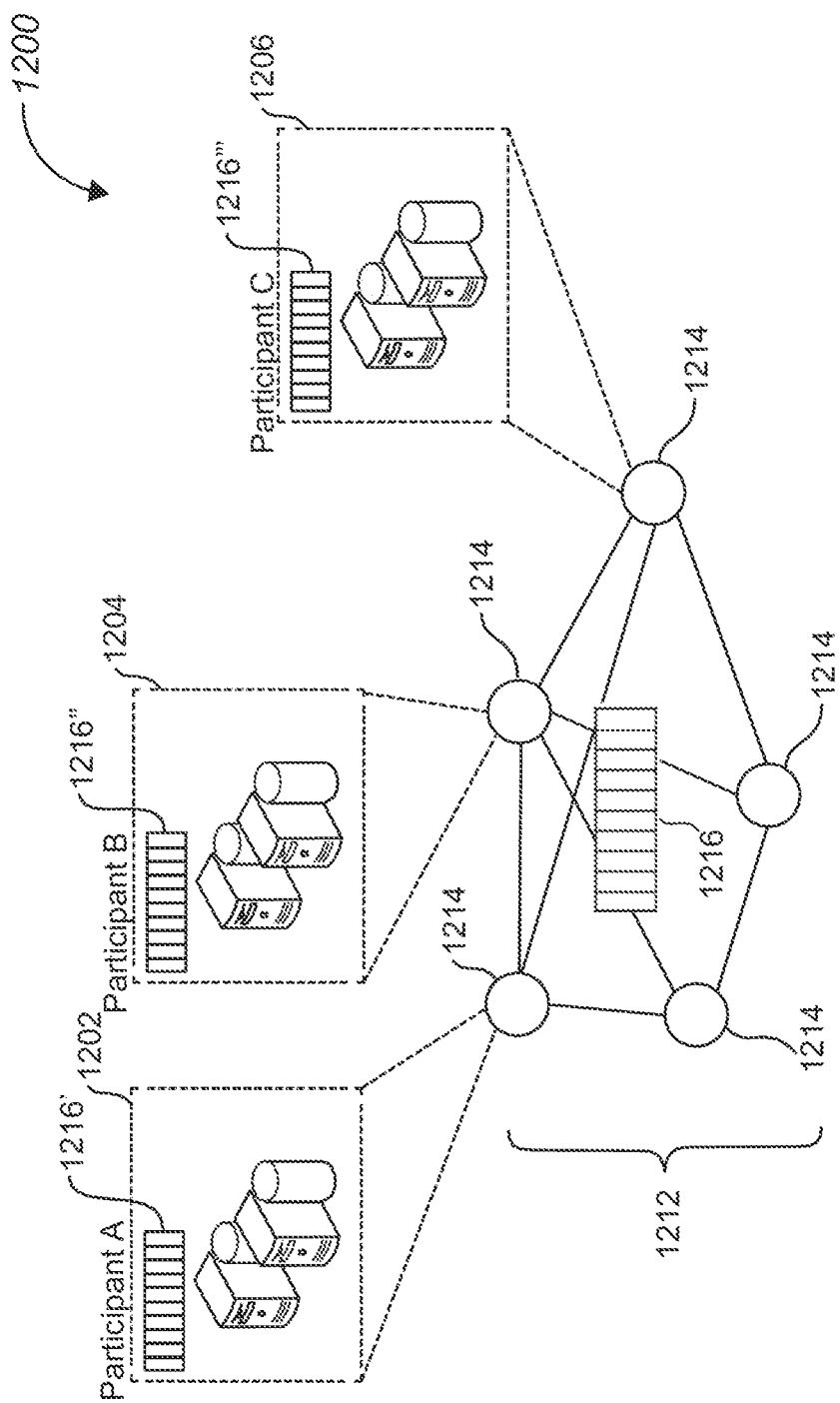
FIG. 9 is a diagram illustrating an example architecture in accordance with embodiments of this specification.

FIG. 9 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 9, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 9, the participant systems 1202, 1204 store respective, complete copies 1216', 1216", 1216'" of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 9, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 9, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 9, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

The descriptions above are merely preferred implementations of the present specification, and are not intended to limit the present specification. Any modification, equivalent replacement, improvement, etc., made without departing from the spirit and principles of the present specification shall fall within the protection scope of the present specification.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by the computing device. Based on the definition in the present specification, the computer readable medium does not include transitory media such as a modulated data signal and carrier.

It should also be noted that terms "include," "comprise" or any other variant thereof is intended to cover non-exclusive inclusion, so that processes, methods, products or devices that include a series of elements include not only those elements, but also include other elements that are not explicitly listed, or elements inherent in such processes, methods, products or devices. An element described by "includes a . . . " further includes, without more constraints, another identical element in the process, method, product, or device that includes the element.

A person skilled in the art should understand that the implementations of the present specification can be provided as methods, systems, or computer program products. Therefore, the implementations of the present specification can take a form of complete hardware implementations, complete software implementations, or implementations combining software and hardware. Further, the implementations of the present specification can take a form of computer program products implemented on one or more computer-usable storage media (including but not limited to a disk storage device, CD-ROM, and an optical storage device) containing computer-usable program code.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A blockchain event processing method, the method comprising:
at a control component of one or more distributed event processing centers coupled to a node device of a blockchain network, wherein the one or more distributed event processing centers are configured to obtain respective blockchain event streams from the node device, deliver the obtained respective blockchain event streams to respective triggers included in the one or more distributed event processing centers, and push a blockchain event included in the blockchain event streams to a service system corresponding to a trigger of the triggers in response to the blockchain event meeting a trigger condition of the trigger;
obtaining push speeds of a plurality of triggers included in an event processing center of the one or more distributed event processing centers;
in response to a difference among the push speeds of the plurality of triggers being greater than a first threshold, establishing a new event processing center, am moving, to the new event processing center, one or more of a trigger having a push speed that is different from a highest push speed of the push speeds by an amount greater than the first threshold or a trigger having a push speed that is different from a lowest push speed of the push speeds by an amount greater than the first threshold; and
establishing a sequence among the one or more distributed event processing centers by sorting the one or more distributed event processing centers level by level based on a delivery progress of each event processing center on a respective blockchain event stream, wherein a delivery progress of a parent event processing center in the sequence on a blockchain event stream of the parent event processing center is greater than a delivery progress of a child event processing center of the parent event processing center in the sequence on a blockchain event stream of the child event processing center.

2. The method according to claim 1, wherein the establishing the new event processing center, and moving, to the new event processing center, the one or more of the trigger having a push speed that is different from the highest push speed by an amount greater than the first threshold or the trigger having a push speed that is different from the lowest push speed by an amount greater than the first threshold includes:
establishing a new child event processing center in the sequence for the event processing center, and moving, to the new child event processing center, the trigger having a push speed that is different from the highest push speed by an amount greater than the first threshold.

3. The method according to claim 1, wherein the establishing the new event processing center, and moving, to the new event processing center, the one or more of the trigger having a push speed that is different from the highest push speed by an amount greater than the first threshold or the trigger having a push speed that is different from the lowest push speed by an amount greater than the first threshold includes:
establishing a new parent event processing center for the event processing center, and moving, to the new parent event processing center, the trigger having a push speed that is different from the lowest push speed by an amount greater than the first threshold.

4. The method according to claim 1, further comprising:
obtaining a delivery progress of each event processing center in the distributed event processing centers on a respective blockchain event stream; and
in response to a second delivery progress of a child event processing center of a parent event processing center in the distributed event processing centers on a blockchain event stream of the child event processing center not being less than a first delivery progress of the parent event processing center on a blockchain event stream of the parent event processing center, moving each trigger in the child event processing center to the parent event processing center, and removing the child event processing center.

5. The method according to claim 4, further comprising:
in response to the second delivery progress of the child event processing center being less than the first delivery progress of the parent event processing center, and a difference between the second delivery progress and the first delivery progress being less than a predetermined second threshold, suspending the parent event processing center from delivering the blockchain event stream obtained by the parent event processing center to each trigger of the parent event processing center;
in response to the second delivery progress becoming not less than the first delivery progress, moving the trigger included in the child event processing center to the parent event processing center, and removing the child event processing center; and
restarting the parent event processing center to continue to deliver the blockchain event stream obtained by the parent event processing center to each trigger included in the parent event processing center.

6. The method according to claim 1, further comprising:
removing an event processing center in response to the event processing center in the distributed event processing centers not including any trigger.

7. The method according to claim 1, further comprising:
creating a new event processing center, the new event processing center including a new trigger, and the new trigger declaring a first location of a blockchain event stream subscribed to by a service system corresponding to the new trigger; and
setting the new event processing center as a parent event processing center of a first event processing center having a delivery progress that is less than the first location.

8. The method according to claim 1, wherein the control component includes centralized control components, and the centralized control components are separately communicatively coupled to the one or more distributed event processing centers.

9. The method according to claim 1, wherein the control component includes distributed control components that are separately disposed in the one or more distributed event processing centers, and each event processing center in the sequence of the one or more distributed event processing centers is communicatively connected to an adjacent event processing center in the sequence.

10. A computer device, comprising a storage device am a processor, wherein the storage device stores a computer program that can be run by the processor, and when running the computer program, the processor performs acts including:
at a control component of one or more distributed event processing centers coupled to a node device of a blockchain network, wherein the one or more distributed event processing centers are configured to obtain respective blockchain event streams from the node device, deliver the obtained respective blockchain event streams to respective triggers included in the one or more distributed event processing centers, and push a blockchain event included in the blockchain event streams to a service system corresponding to a trigger of the triggers in response to the blockchain event meeting a trigger condition of the trigger;
obtaining push speeds of a plurality of triggers included in an event processing center of the one or more distributed event processing centers;
in response to a difference among the push speeds of the plurality of triggers being greater than a first threshold, establishing a new event processing center, and moving, to the new event processing center, one or more of a trigger having a push speed that is different from a highest push speed of the push speeds by an amount greater than the first threshold or a trigger having a push speed that is different from a lowest push speed of the push speeds by an amount greater than the first threshold; and
establishing a sequence among the one or more distributed event processing centers by sorting the one or more distributed event processing centers level by level based on a delivery progress of each event processing center on a respective blockchain event stream, wherein a delivery progress of a parent event processing center in the sequence on a blockchain event stream of the parent event processing center is greater than a delivery progress of a child event processing center of the parent event processing center in the sequence on a blockchain event stream of the child event processing center.

11. The computer device according to claim 10, wherein the establishing the new event processing center, and moving, to the new event processing center, the one or more of the trigger having a push speed that is different from the highest push speed by an amount greater than the first threshold or the trigger having a push speed that is different from the lowest push speed by an amount greater than the first threshold includes:
establishing a new child event processing center in the sequence for the event processing center, and moving, to the new child event processing center, the trigger having a push speed that is different from the highest push speed by an amount greater than the first threshold.

12. The computer device according to claim 10, wherein the establishing the new event processing center, and moving, to the new event processing center, the one or more of the trigger having a push speed that is different from the highest push speed by an amount greater than the first threshold or the trigger having a push speed that is different from the lowest push speed by an amount greater than the first threshold includes:
establishing a new parent event processing center for the event processing center, and moving, to the new parent event processing center, the trigger having a push speed that is different from the lowest push speed by an amount greater than the first threshold.

13. The computer device according to claim 10, wherein the acts further include:
obtaining a delivery progress of each event processing center in the distributed event processing centers on a respective blockchain event stream; and
in response to a second delivery progress of a child event processing center of a parent event processing center in the distributed event processing centers on a blockchain event stream of the child event processing center not being less than a first delivery progress of the parent event processing center on a blockchain event stream of the parent event processing center, moving each trigger in the child event processing center to the parent event processing center, and removing the child event processing center.

14. The computer device according to claim 13, wherein the acts further include:
- in response to the second delivery progress of the child event processing center being less than the first delivery progress of the parent event processing center, and a difference between the second delivery progress and the first delivery progress being less than a predetermined second threshold, suspending the parent event processing center from delivering the blockchain event stream obtained by the parent event processing center to each trigger of the parent event processing center;
- in response to the second delivery progress becoming not less than the first delivery progress, moving the trigger included in the child event processing center to the parent event processing center, and removing the child event processing center; and
- restarting the parent event processing center to continue to deliver the blockchain event stream obtained by the parent event processing center to each trigger included in the parent event processing center.

15. The computer device according to claim 10, wherein the acts further include:
- creating a new event processing center, the new event processing center including a new trigger, and the new trigger declaring a first location of a blockchain event stream subscribed to by a service system corresponding to the new trigger; and
- setting the new event processing center as a parent event processing center of a first event processing center having a delivery progress that is less than the first location.

16. The computer device according to claim 10, wherein the control component includes centralized control components, and the centralized control components are separately communicatively coupled to the one or more distributed event processing centers.

17. The computer device according to claim 10, wherein the control component includes distributed control components that are separately disposed in the one or more distributed event processing centers, and each event processing center in the sequence of the one or more distributed event processing centers is communicatively connected to an adjacent event processing center in the sequence.

18. A non-transitory storage medium having computer executable instructions stored thereon, which when executed by a processor, configure the processor to implement acts including:
- at a control component of one or more distributed event processing centers coupled to a node device of a blockchain network, wherein the one or more distributed event processing centers are configured to obtain respective blockchain event streams from the node device, deliver the obtained respective blockchain event streams to respective triggers included in the one or more distributed event processing centers, and push a blockchain event included in the blockchain event streams to a service system corresponding to a trigger of the triggers in response to the blockchain event meeting a trigger condition of the trigger;
- obtaining push speeds of a plurality of triggers included in an event processing center of the one or more distributed event processing centers;
- in response to a difference among the push speeds of the plurality of triggers being greater than a first threshold, establishing a new event processing center, and moving, to the new event processing center, one or more of a trigger having a push speed that is different from a highest push speed of the push speeds by an amount greater than the first threshold or a trigger having a push speed that is different from a lowest push speed of the push speeds by an amount greater than the first threshold; and
- establishing a sequence among the one or more distributed event processing centers by sorting the one or more distributed event processing centers level by level based on a delivery progress of each event processing center on a respective blockchain event stream, wherein a delivery progress of a parent event processing center in the sequence on a blockchain event stream of the parent event processing center is greater than a delivery progress of a child event processing center of the parent event processing center in the sequence on a blockchain event stream of the child event processing center.

19. The storage medium according to claim 18, wherein the establishing the new event processing center, and moving, to the new event processing center, the one or more of the trigger having a push speed that is different from the highest push speed by an amount greater than the first threshold or the trigger having a push speed that is different from the lowest push speed by an amount greater than the first threshold includes:
- establishing a new child event processing center in the sequence for the event processing center, and moving, to the new child event processing center, the trigger having a push speed that is different from the highest push speed by an amount greater than the first threshold.

20. The storage medium according to claim 18, wherein the establishing the new event processing center, and moving, to the new event processing center, the one or more of the trigger having a push speed that is different from the highest push speed by an amount greater than the first threshold or the trigger having a push speed that is different from the lowest push speed by an amount greater than the first threshold includes:
- establishing a new parent event processing center for the event processing center, and moving, to the new parent event processing center, the trigger having a push speed that is different from the lowest push speed by an amount greater than the first threshold.

* * * * *

UNITED STATES PATENT AND TRADEMARK OFFICE
CERTIFICATE OF CORRECTION

PATENT NO. : 11,314,564 B2  
APPLICATION NO. : 17/362740  
DATED : April 26, 2022  
INVENTOR(S) : Mingliang Yin Page 1 of 1

It is certified that error appears in the above-identified patent and that said Letters Patent is hereby corrected as shown below:

In the Claims

Column 26, Claim 1, Line 11:
"event processing center, am moving,"
Should read: --event processing center, and moving,--.

Column 27, Claim 10, Line 51:
"comprising a storage device am a"
Should read: --comprising a storage device and a--.

Signed and Sealed this
Twenty-seventh Day of August, 2024

Katherine Kelly Vidal
*Director of the United States Patent and Trademark Office*